Figure 13:
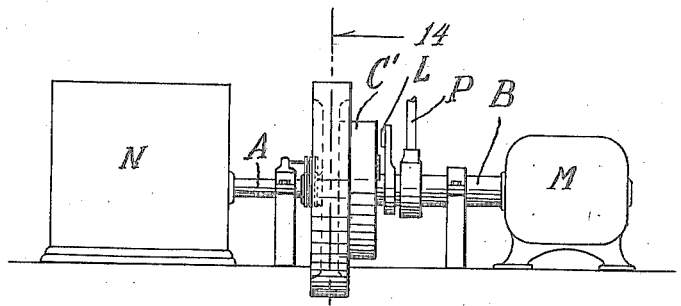

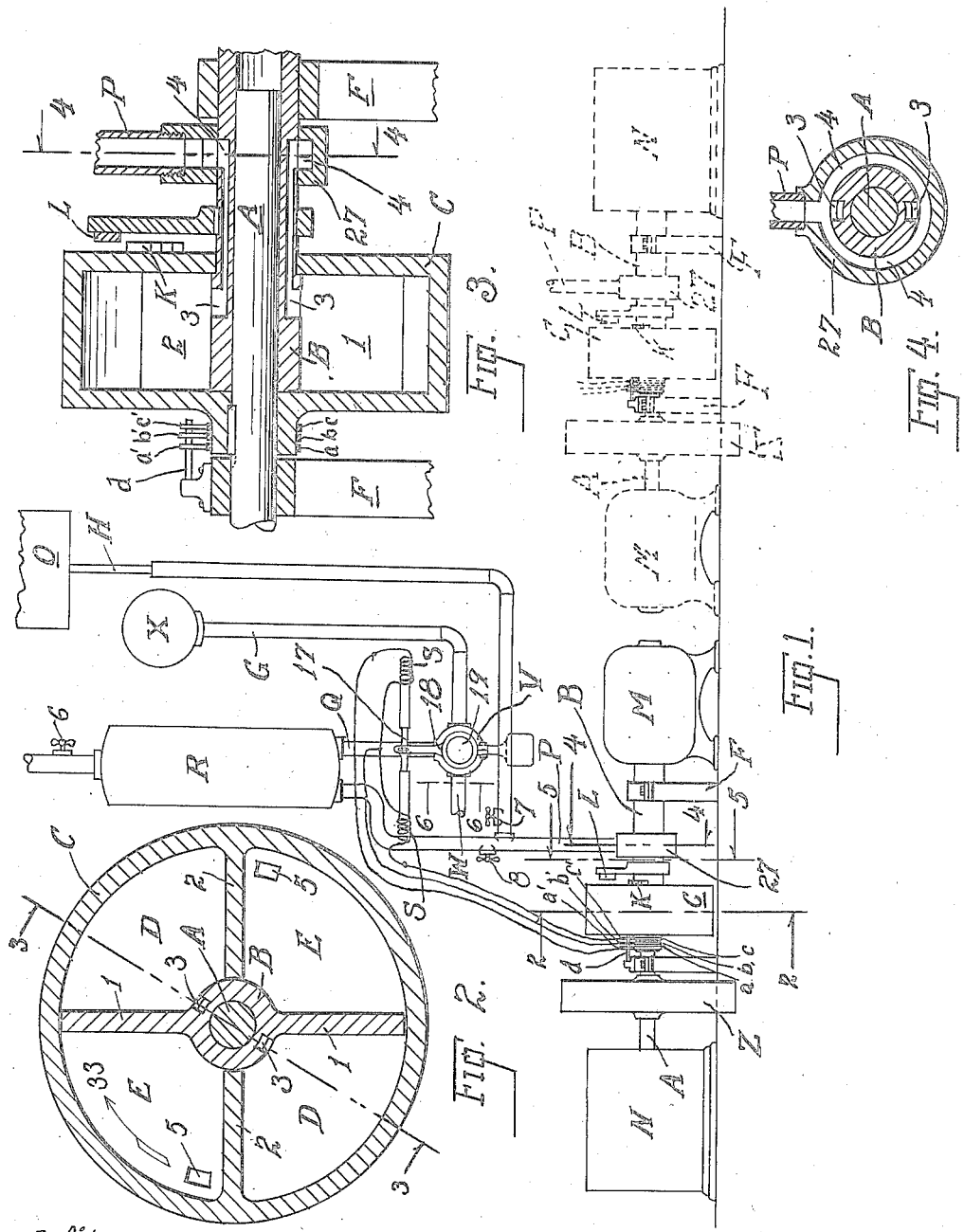

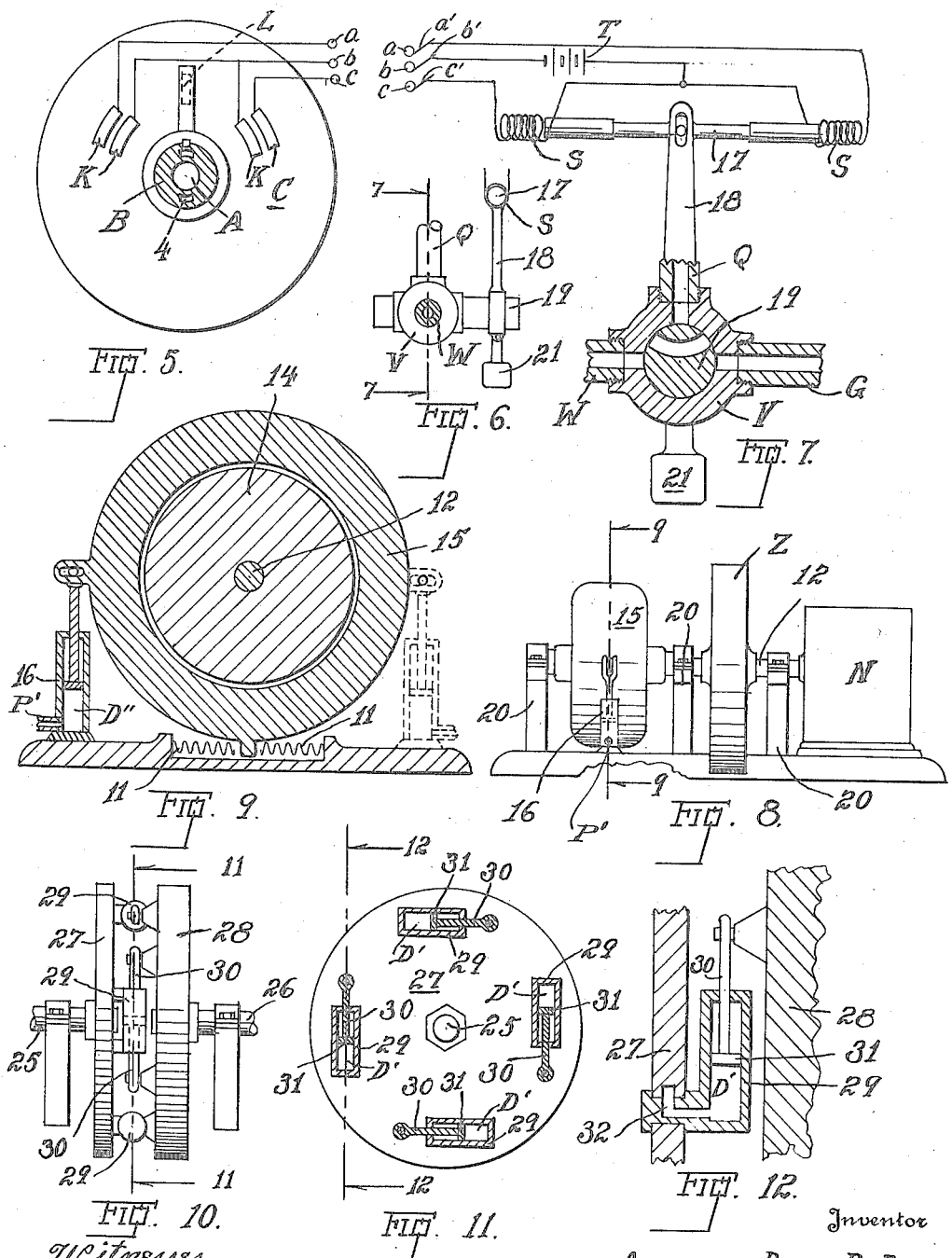

Oct. 2, 1928.

A. D. DU BOIS 1,685,839

TORQUE EQUALIZING SYSTEM

Filed Dec. 30, 1925     3 Sheets-Sheet 3

Inventor
ALEXANDER DAWES DuBois
by his Atty N. DuBois.

Patented Oct. 2, 1928.

1,685,839

UNITED STATES PATENT OFFICE.

ALEXANDER DAWES DU BOIS, OF MINNEAPOLIS, MINNESOTA.

TORQUE-EQUALIZING SYSTEM.

Application filed December 30, 1925. Serial No. 78,421.

My invention relates to torque-equalizing means.

The purposes of the invention are: to provide means whereby a motor drawing practically constant power from the power supply can deliver pulsating power, through a flywheel, to a driven machine; to provide means whereby an engine generating pulsating power can deliver constant power to a driven machine; to provide means whereby practically constant torque can be maintained in a constant-speed motor while the motor is delivering pulsating torque to its driven load in conjunction with a flywheel; to provide means whereby approximately uniform torque can be delivered to a flywheel, which is a part of the mechanism, while the flywheel delivers pulsating torque to a driven machine; to provide means whereby pulsating torque can be delivered to a flywheel, which is part of the mechanism, while the flywheel delivers uniform torque to a driven machine; to provide means whereby practically constant speed can be maintained in a uniformly loaded machine driven by a pulsating-speed motor or engine having a flywheel; to provide fluid-actuated means whereby practically constant torque at any constant speed in a driver shaft can be transformed into pulsating torque and speed in a driven shaft carrying a flywheel; to provide fluid-actuated means whereby pulsating torque with pulsating speed, in a driver shaft carrying a flywheel, can be transformed into constant torque at constant speed in a driven shaft; to provide means entirely apart from flywheels, whereby angular space-phase displacement can occur between a driver shaft and a driven shaft, while the shafts are rotating, without altering the torque transmitted; to provide fluid-actuated means whereby an alternating-current generator, operating in parallel with other alternating-current generators, can remain comparatively free from synchronizing currents, while its prime mover or driving member flucuates momentarily in speed.

*Utility of method.*—The utility of the method lies in its ability to permit angular displacement of the driving member with relation to the driven member without altering the torque transmitted from one to the other; and also in its ability, when used in conjunction with a flywheel, to average the torque transmitted, thereby making a uniform or constant torque equivalent to a nonuniform or pulsating torque.

*Uses.*—Its uses include all applications where it is desired to transform pulsating power and pulsating speed into constant power and constant speed, and all applications where it is desired to transform constant power and speed into pulsating power and pulsating speed.

I accomplish these purposes by means hereinafter described, and illustrated in the accompanying drawings to which reference is hereby made, and in which:—

Figure 14:
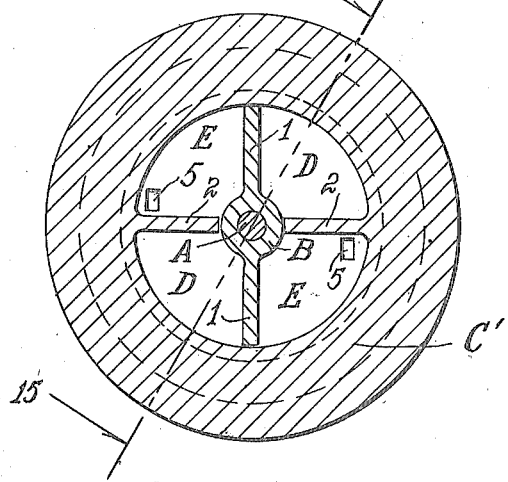
Figure 15:
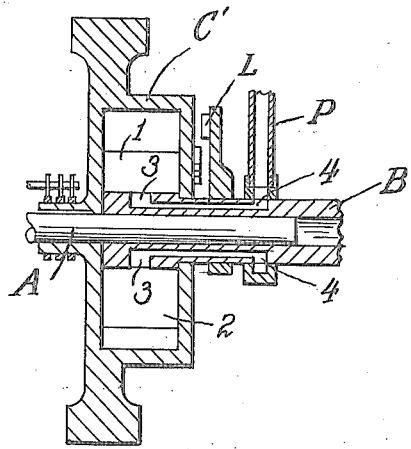
Figure 16:
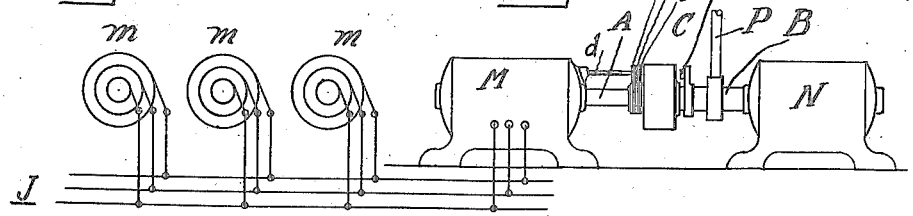

Figure 1 is an elevation of a typical equipment embodying my invention and shows electrically-operated means controlling the pressure of fluid in the system. Fig. 2 is an enlarged vertical section taken on the line 2—2 of Fig. 1. Fig. 3 is an oblique section in the plane of the line 3—3 of Fig. 2. Fig. 4 is an enlarged vertical section taken on the line 4—4 of Fig. 1. Fig. 5 is an enlarged vertical section taken on the line 5—5 of Fig. 1. Fig. 6 is an enlarged vertical section taken on the line 6—6 of Fig. 1. Fig. 7 is an enlarged vertical section through the three-way valve, taken on the line 7—7 of Fig. 6. Fig. 8 is an elevation showing a modified chambered-structure in co-operative relation to a flywheel mounted on a shaft which drives a pulsating load. Fig. 9 is an enlarged vertical section taken on the line 9—9, of Fig. 8. Fig. 10 is a side elevation of another modified form of chambered-structure. Fig. 11 is a vertical section taken on the line 11—11 of Fig. 10. Fig. 12 is an enlarged vertical section taken on the line 12—12 of Fig. 11. Fig. 13 is an elevation of an equipment of modified construction, in which the chambered-structure is integral with a flywheel. Fig. 14 is a vertical section taken on the line 14—14 of Fig. 13. Fig. 15 is an oblique section through the chambered flywheel taken on the line 15—15 of Fig. 14; and Fig. 16 is a diagram illustrating an application of the invention to the parallel operation of alternators.

Similar reference letters and numerals designate similar parts in the several views.

Briefly stated, my invention comprises the application of constant pressure, by means of fluid, to maintain constant torque throughout each cycle of speed pulsations.

I introduce a fluid driving-link between the driver and the driven machine. The fluid driving-link consists of confined fluid, maintained, for the requisite periods of time, at suitable approximately constant pressure, but permitted to flow into and out of suitable torque transmitting chambers of a chambered structure having movable walls. The movable walls are of constant area so that a given fluid pressure within each chamber exerts a constant force upon the two opposing walls, tending to separate them. One of the movable walls of each chamber transmits this force to the driver shaft, the other to the driven shaft.

The word fluid, as used herein, is understood to mean either a liquid, such as water or oil, a gas or mixture of gases such as air, or a combination of liquid and gas in the same system. The pressure, in the torque transmitting chamber, remains unaffected by the pulsations of speed of one shaft with respect to the other, and in that sense has been referred to as constant; but provision is made for adjusting the pressure as often as need be, to meet the requirements of the average torque to be transmitted.

The fluid may be maintained at the desired pressure by any known means, such as by free communication with a receiver, pressure tank, or stand-pipe. Any known means may be employed to confine the fluid and conduct it to the fluid chambers of the chambered structure, and any known means may be used to transmit the torque of the driver member and the counter torque of the driven member to the respective movable walls of the chambered structure. Such details may be varied without departure from my invention.

When used in conjunction with a flywheel, the torque transmitting chambers may be situated at any suitable point in the system of torque transmission; and any means of transmitting torque, including such means as the magnetic flux in the air gap of an electric motor, may be inserted between the chambered structure and the flywheel, without departing from the invention.

In order to illustrate a complete system embodying the principles stated above, I show a typical equipment in Fig. 1 and will describe first this typical embodiment of the invention, referring to the forms of elements shown in Figs. 1 to 7 inclusive; and will describe afterwards, in succession, the modified constructions illustrated in the other views.

The forms of elements, and the combination of those elements, obviously may be varied to meet different conditions of use, and still keep within the scope of my claims. For example; a chambered structure similar to that shown in Fig. 9, or that shown in Fig. 11, may be suited to low speed, great torque, or small angular displacement; while a chambered structure similar to Fig. 2 may be better suited to high speed, moderate torque, or great angular displacement.

It is to be noted that all the constructions include means for fluid control of the torque of the co-acting mechanisms.

*Chambered structures.*—In Figs. 1, 2, 3 and 4; A and B are two concentric shafts, either one of which may be the driver and the other the driven. One of these shafts may rotate with pulsating angular velocity. The other shaft rotates at constant angular velocity. Rigidly attached to the shaft A is a cylindrical structure C, having internal partitions 2, 2. Rigidly attached to the shaft B, are vanes 1, 1, which fit snugly in the cylindrical structure C with a turning fit, so that the shaft B can turn through an angular displacement with relation to shaft A. The shafts A and B rotate in suitable bearings F, F.

The chambers D, D, are filled with fluid, under suitable pressure transmitted through the pipe P and the openings 4 and 3 in the shaft B (Fig. 3) from any source of fluid under suitable pressure.

The openings 5 (Fig. 2) lead to the outside; they serve to drain the leakage out of chambers E, E and to prevent appreciable compression of air in E, E, when these chambers are contracted during the normal operation of the chambered structure. Obviously any suitable means for preventing leakage through joints or moving contact surfaces in the chambered structure, and elsewhere in the system, may be employed.

To illustrate the functions of the parts, assume that shaft A is a driven shaft, carrying a flywheel Z and rotating with pulsating speed. Assume that shaft B is the driver shaft, rotating at constant speed. Under these conditions the direction of rotation is considered to be as indicated by the arrow 33 in Fig. 2. Since the flywheel and its shaft A are alternately retarding and accelerating, while the driver shaft B is rotating at constant speed, it is evident that the two shafts oscillate with respect to each other, and the wall or vanes 1, 1, must alternately advance and retreat, in the cylindrical casing, with reference to the walls or partitions 2, 2. Hence the volume of each fluid chamber D must decrease or increase as the flywheel lags or leads with reference to the driver shaft B. When the opposing walls 1 and 2 of chamber D are approaching each other, the volume of the chamber is diminished and a portion of the fluid flows out through the ports 3 and the pipe P. When the opposing walls are receding from each other, the volume of the chamber is increased and fluid flows into the chamber through the ports 3. The fluid is maintained at constant fluid pressure from the pressure source, through the pipe P; hence the total force acting upon the driven walls 2, 2, and reacting upon the driver walls 1, 1, within the chambered structure, remains constant. The fluid cannot exert either a greater or a less total force against the vanes 1, 1, of the driver shaft, because the vanes have constant area, regardless of their position, and the fluid exerts constant pressure per unit of area. Therefore the counter-torque imposed upon the driver shaft is constant, whether the flywheel is accelerating or retarding. This statement assumes that the area of the passages 3, 4, etc., is great enough to avoid excessive velocity of fluid and consequent appreciable loss of head by friction. It also assumes that the inertia of the fluid set in motion is comparatively negligible. Slight variations of pressure from these causes will be unimportant in practice.

The fluid pressure will be adjusted to the proper value to transmit the average torque required.

If the counter-torque of the load becomes too great, or if the pressure-adjusting device should get out of order, the wall or vane 1 may close up against the wall or partition 2, and drive by contact of one with the other; but in doing so, the ports 3 will be gradually closed by passing under the bearing surface of the partitions 2, thus throttling the outflow of fluid and effectually cushioning the impact between 1 and 2.

If the pressure in the chambers D becomes too great to balance the counter-torque of the load, and if this condition is not corrected before the walls or vanes 1 reach the limit of travel in the opposite direction, they will throttle the outflow of air through the openings 5 by gradually covering these openings, thus forming an air cushion to effectually prevent objectionable impact between the back surfaces of 1 and 2. Obviously, other suitable cushions may be used to relieve the impact.

Since the torque transmitted from the driver shaft to the flywheel, by the means described, is practically constant at all times, it is evident that the flywheel will retard when the counter-torque or "load" upon it (from the driven machine) exceeds the torque transmitted to it from the driver shaft; and the flywheel will accelerate when the counter-torque of the driven machine is less than the constant torque transmitted from the driver shaft. The constant torque delivered to the flywheel through the fluid driving link must of course be adjusted, by proper adjustment of the fluid pressure, to be equal to the average torque required to drive the pulsating load of the driven machine. During brief intervals when the load requirements of the driven machine are less than this, the excess energy is stored in the accelerating flywheel, and when the requirements are greater, the deficiency is made up by energy restored to the driven shaft from the retarding flywheel.

The only reason for describing shaft B as the driver, and shaft A as the driven, is convenience of description. It is evident that shaft A could, equally well, be the driver and shaft B the driven.

The system shown in Fig. 1 is arranged to utilize one or more fluids, namely, an incompressible fluid such as water or oil, under a controlled head sufficient for the purpose; or an incompressible fluid co-acting with a compressible fluid such as gas or air; or a single compressible fluid.

*Pressure means.*—Any suitable source of adjustable fluid pressure may be used to keep the fluid in the chambered structure at the desired pressure.

One such source, using a liquid only, is an extensible standpipe H diagramatically shown in Fig. 1, in which, O is an open tank, or enlargement of the standpipe, vertically adjustable with reference to the pipe P. The gravity head of the liquid in the system is varied by raising or lowering the tank O by any suitable means. When this source is in use the valve 7 is open and the valve 8 is closed.

Another such source is a closed, pneumatic-pressure tank R, such as shown in Fig. 1. When this source is in use, valve 8 is open and the valve 7 is closed. If liquid is used in the torque transmitting chambers of the chambered structure, the connecting pipe P and the lower portion of the tank R may be occupied by the liquid. Above the liquid in tank R, is compressed air at suitable pressure, which may be adjusted by any known means. For example; to increase the pressure in the torque-equalizing system, more air may be forced into tank R, from any suitable source of greater air pressure, under the control of valve 6; or more liquid may be admitted, from a source of greater hydraulic pressure, thus further compressing the air already above the liquid in the tank. To decrease the pressure, a portion of the air, or a portion of the liquid, may be allowed to escape from tank R, by opening suitable valves to the atmosphere.

The volume of the pressure tank or receiver R is many times greater than the sum of the volumes of the torque transmitting chambers, so that the variation of level of liquid in the receiver R will be slight, the volume of the compressed air above the liquid will be changed only a relatively small amount, and its pressure will therefore remain practically constant during the inflow and outflow (through P) of the liquid used in the torque transmitting chambers.

It is obvious that the liquid could be omitted from the closed tank system, and compressed air or gas could be substituted. The torque equalizer will operate with compressed air or other gas as well as with water or oil or other liquid. Compressed air would be more difficult to confine without objectionable leakage, but it has an advantage over liquid, in that its inertia and friction are less.

The adjustment of the fluid pressure may be automatic, by any suitable means; for instance an electrically actuated valve V arranged to increase the fluid pressure when the driver shaft advances ahead of a certain pre-determined angular position with relation to the driven shaft, and to reduce the pressure whenever the driver shaft lags more than a certain pre-determined angle.

Figs. 1, 5, 6 and 7 show details of an electrical control through the agency of a three-way valve V arranged to augment or decrease the pressure in a pneumatic and hydraulic system. The pipe P connects the chambered structure of the torque equalizer with a pressure tank R. A pipe G conducts fluid from any source X of sufficiently high head or pressure through valve V and pipe Q into the tank R. A waste pipe W gives outlet to atmosphere. The three-way valve V is arranged to be turned by any suitable electrical operating device such as electro-magnets S.

When the valve V is in its normal or central position it is closed to Q and to G. When the valve is turned, say to the right, it admits more fluid into R from the high-pressure pipe G, thus further compressing the air in R and thereby increasing the pressure in P and D. When the valve is turned to the left it connects the tank R with the waste pipe W and allows fluid to escape from R, thus reducing the pressure.

The valve V is operated by an arm 18 (Figs. 6 and 7) connected with the valve plug 19, which is normally held in central or closed position by any suitable form of spring, or by a gravitating weight 21.

The arm 18 is connected to a double-ended magnet plunger 17, actuated by the respective magnet coils S to shift the arm to the right, or to the left, as the case may be.

Electrical actuating means chosen for illustration in Figs. 1, 5, 6 and 7 consist of a contact brush L mounted on the shaft B; contact segments K, mounted on the structure C, which is carried by the shaft A; slip rings $a$, $b$, $c$, mounted on shaft A and electrically connected with the segments K; slip-ring brushes $a'$, $b'$, $c'$, mounted on a stationary support $d$ and bearing upon the slip-rings; and a suitable source of electromotive force T, electrically connected with the slip-ring brushes $a'$, $b'$, $c'$, and with the magnet coils S, S, as shown.

Whenever the angular deflection of the shaft A with respect to the shaft B is such as to bring the left-hand segments K (Fig. 5) into contact with brush L, an electric circuit is thereby closed from the source T, through slip-rings $b$ and $a$ to energize the right-hand magnet coil S (Fig. 7). When the angular deflection of shaft A is such as to bring the right-hand segments K into contact with the brush L, an electric circuit is closed from source T, through slip rings $b$ and $c$, energize the left-hand magnet coil S.

The fluid, controlled by the automatic valve V as above described, may be either a liquid, or a gas. If a gaseous fluid such as air is used, the pipe G may lead from an existing compressed air system and the inlet 6 into tank R may be at the top, rather than at the bottom of the tank. In that case the amount of liquid in the system (if any) will not be changed by the ingress or egress of compressed air.

Although any suitable means may be employed for maintaining and for adjusting the fluid pressure, it is desirable that the pipe or passage-way P shall be short and so designed as to avoid high velocity of fluid, in order that the friction and inertia effects of the fluid may be comparatively small. The typical methods described above show that any one of numerous different methods could be applied and keep within the scope of my invention.

*A modified form and location of chambered structure.*

As previously stated, any torque-transmitting means may be inserted between the chambered structure and the flywheel (in the case of a motor) or between the chambered structure and the driving shaft (in the case of an electric generator) without departing from my invention.

The chambered structure previously described was so situated in the mechanical torque transmitting system as to rotate with the driver and the driven shafts, but it is not always necessary that it be so situated. For example, an electric or other motor 15 may be arranged, as in Figs. 8 and 9, in such a manner that the chambered structure is attached to the stationary frame or foundation.

To explain the functioning of the torque-equalizing means with this arrangement of parts, it will be useful to recall a well known principle of electric motors, namely; that any change in the counter-torque imposed by the driven load causes, during the time interval of the change, a change of speed of the rotor. This is true of synchronous motors as well as of other types of electric motors. While the torque is increasing, the rotor of the motor is retarding; while the torque is decreasing the rotor is accelerating. If this action is pulsating in nature, as it must be with an effective flywheel, it causes pulsating power to be drawn from the supply line. The pulsations of power are due to changes of relative speed of the rotor with respect to the stator. This relative speed can be maintained constant if the stator is permitted to oscillate under proper control of the chambered structure.

Referring to Figs. 8 and 9 let the stator 15 of the motor be mounted on bearings 20, so that it is free to turn about the axis 12 of the rotor 14; but let it be restrained from turning by the action of the fluid in the torque-equalizing chamber D″ of the cylinder 16. Let the flywheel and the rotor of the motor be mounted on the shaft 12 which drives the pulsating load. In practice the flywheel and the rotor may be one structure if desired.

In operation the rotor periodically accelerates and retards while the flywheel stores and restores energy due to the pulsating nature of the counter-torque of the driven machine. When the rotor retards, it tends to increase its tangential reaction upon the stator, (through the pull of the magnetic flux in the air gap) but any increase of this reaction turns the stator backward, forcing fluid out of the torque-equalizing chamber D″, until the retardation of the rotor ceases. The pipe P′ is the equivalent of pipe P (Fig. 1) which conveys fluid under pressure from the tank R. The action of the fluid under pressure in the pipe P′ is exactly the same as the action of the fluid under pressure in the pipe P; and the cylinders 16 are chambered structures in the same sense that the element C (Fig. 1) is a chambered structure supplied with fluid under pressure from the source R of fluid supply. When the rotor accelerates, the stator is turned forward again by the constant pressure of the fluid in the chambered structure or cylinder 16. The stator is turning backward while the rotor is retarding, and the stator is turning forward while the rotor is accelerating, the amount of this turning being dependent upon the amount of change of speed of the rotor. In this manner the driving torque transmitted from stator to rotor remains constant or uniform, and the speed of the rotor with respect to the stator remains uniform, while the actual speed of the rotor, with respect to the earth and the driven machine, pulsates and permits the flywheel to function effectively.

As the action continues, the stator oscillates, while the rotor varies in speed; and the power drawn from the electric supply line remains practically constant, while the power delivered by the flywheel to the driven machine pulsates. The pressure of the fluid, in this arrangement, as in the others, must be adjusted to meet the average torque requirements of the cycle of pulsating torque.

The stator of the motor has of necessity a considerable moment of inertia, but in practice this may be made small in comparison to that of the flywheel, so that it will only modify and will not annul the desired effect. Furthermore adjustable springs 11 may be used to absorb the energy of the moving stator and restore that energy in reversing the motion of the stator mass. It is well known to those skilled in mechanics that an oscillating mass and a spring may be so combined as to produce mechanical resonance.

The oscillating mass gives up its kinetic energy to the spring at each oscillation and the spring returns the energy to the mass, to accelerate it, after it has brought the mass to rest. Such a combination has a natural time period of oscillation depending upon the stiffness of the spring in relation to the inertia of the mass. In the system above described it is possible to choose springs of such stiffness and range of action as will cause the natural period of the oscillating stator to be practically equal to the period of impressed speed pulsations of the rotor, thereby practically eliminating or reducing to negligible proportions, the inertia effects of the stator.

*A second modified form of chambered structure.*

Another suitable form of chambered structure is shown in Figs. 10, 11 and 12. In this form the chambered structure rotates. The mechanism comprises: a pulsating-speed shaft 26; a flywheel 28 fixed on the shaft 26; a uniform speed shaft 25, co-axial with the shaft 26; a disc 27 fixed on the shaft 25; cylinders 29 pivotally connected with the disc 27; plunger rods, or piston rods 30, pivotally connected with the flywheel 28; and plungers or pistons 31 carried by the plunger rods or piston rods and sliding in the respective cylinders 29.

In this instance fluid chambers D′ of variable volume, are formed by the cylinders 29 and the plungers or pistons 31. The two movable walls of constant area consists of the piston and the opposite cylinder end. Passages for connecting the chambers D′ with the pressure tank or standpipe may be of any suitable form of construction, such as indicated at 32 in Fig. 12 and at 4 in Fig. 3.

The operation of this embodiment of the torque-equalizing means will be obvious from descriptions previously given. The chambered structure permits an angular displacement of the shaft 26 about its axis, with reference to the shaft 25, the extent of the displacement depending upon the location of the cylinders 29 and the length of stroke of their pistons or plungers.

*Applications.*

Pulsating speed is very objectionable in many kinds of apparatus, and numerous applications of the invention will therefore be apparent to persons skilled in the mechanic arts. The following examples are selected merely as an aid to full comprehension of the invention. Examples 1 and 2 are chosen to illustrate its use in connection with flywheels. In order to store energy a flywheel must be accelerated, and in order to give back this energy it must be retarded. Therefore a flywheel, to be effective, must operate with non-uniform or pulsating speed. The invention is applicable wherever a flywheel is employed.

Example 3 is chosen to illustrate an application apart from flywheels.

*Example 1.*—Referring to Fig. 1, let the device M be an electric motor; let the device N be a driven machine having inherently pulsating power characteristics, such as a gas compressor, a forming press, or a rolling mill. (This is the case previously assumed in describing the functions of parts in the typical embodiment of the invention.

The machine N and its flywheel Z operate with pulsating speed. The motor M operates at constant or unvarying speed. The torque delivered from the flywheel to the machine N is pulsating, but the torque delivered from the motor to the flywheel is uniform and the motor draws uniform power from its power line.

At each compression stroke of the driven machine, its increased counter-torque retards the flywheel, taking the necessary excess of energy from it. But the slowing down of the flywheel cannot retard the motor because the constant pressure in the torque transmitting chambers does not increase. The chamber-ends 1 and 2 approach each other and a portion of the fluid is forced out of the chambers D.

During the return stroke of the driven machine or interval when its counter-torque is slight, the torque transmitted by the torque transmitting chambers exceeds the torque required by the driven machine and the difference is available to accelerate the flywheel. The fluid flows into chambers D again, pushing the flywheel shaft ahead. At each stroke of the driven machine this cycle of actions is repeated.

The same example might refer to Fig. 8, assuming 15 to be the electric motor, and N the driven machine having a flywheel Z.

It might also refer to Fig. 13, assuming M to be an electric motor driving a machine N having a chambered flywheel C'.

*Example 2*—Referring again to Fig. 1 let M be an electric generator. Let N be a gas engine, having a flywheel Z and driving the generator through the torque-equalizer C. The engine delivers pulsating torque to its flywheel which must therefore rotate with pulsating speed, but the generator rotates at constant speed and maintains uniform or constant voltage at its terminals.

When the flywheel of the engine is accelerated, by an explosion in the cylinder, it does not accelerate the generator because the constant pressure in the torque transmitting chambers does not increase and therefore cannot transmit any increased torque to its driven shaft. The chamber-ends 1 and 2, (Fig. 2) approach each other and a portion of the fluid is forced out of the chambers D; but as the flywheel retards, the fluid flows into chambers D again, maintaining constant torque and pushing the driven (generator) shaft ahead, at constant speed. At each explosion in the cylinder this cycle of actions is repeated.

This example might equally well refer to Figs. 8 and 9, assuming the gas engine to be represented by N having a fly-wheel Z, and driving an electric generator 15 equipped with a chambered structure 16.

It might also refer to Figs. 13, 14 and 15, by assuming N to be a gas engine having a chambered flywheel C' and driving an electric generator M.

*Example 3.*—Referring to Fig. 16, let M be an alternating current generator, operating in parallel, and therefore in synchronism, with other alternators *m*, *m*, *m*, on an electric power system J. Let N be a steam turbine or other prime mover, of any kind, driving the generator through the torque-equalizer C. Let the prime mover N have a governor differing somewhat in characteristics from the other governors on the system, so that there is a tendency to the phenomenon known as a "hunting governor"; or let there be a tendency in the prime mover to vary its speed periodically in each revolution (as in the case of a reciprocating steam engine). Under such conditions, if the torque-equalizer were not used, synchronizing currents would flow between the alternator M and the other alternators *m*, *m*, *m*, in parallel with it, to keep the alternator M in synchronism with the other alternators. Such currents may be very severe and objectionable, aggravating the phenomenon of "hunting" and causing serious difficulties. When the torque-equalizer C is in service it permits the alternator M to remain in exact synchronism with the electrical system to which it is connected; the torque in its shaft A remains uniform, (assuming the load on the alternator and the frequency of the system to be uniform for the time being), while the speed of the prime-mover shaft B fluctuates as required by the characteristics of the prime mover or its governor. By this means the synchronizing currents in M are obviated. The alternator can have no tendency to operate as a motor because a uniform forward torque is imposed upon its shaft at all times through the action of the fluid in the chambered structure of the torque-equalizer. In short, the alternator follows the frequency of the system into which it is feeding, while the prime mover is permitted to follow its own peculiar speed characteristics without altering the so-called phase-shift of the alternator.

Having fully described my invention what I claim as new and desire to secure by Letters Patent is:

1. In the practice of power transmission, the art of transmitting the force of a turning moment through the particles of a displaceably disposed fluid, under controlled fluid pressure, in chambers of variable volume; thereby providing constant torque through constant pressure in the fluid, and providing for pulsations of angular velocity by the displaceable character of the fluid.

2. The improvement in the art of power transmission whereby variations of angular velocity of a rotating element can occur without change of its active or reactive torque; consisting in transmitting the force element of the power through a body of fluid, under pressure from an external source, in chambers suitable to utilize the mobility of said fluid, by displacing portions thereof, without altering the fluid pressure.

3. The art of equalizing the flow of energy through a rotating mass having an effective moment of inertia, so that the rotating mass can deliver energy at a uniform rate while receiving energy at a non-uniform rate, and can deliver energy at a non-uniform rate while receiving energy at a uniform rate; said art consisting in transmitting the force element of said energy through the particles of a displaceably disposed fluid, under controlled fluid pressure, in chambers of variable volume; thereby providing for pulsations of angular velocity of said rotating mass by reason of the displaceable character of the fluid, while providing constant torque through constant pressure in the fluid.

4. The method of effecting torque equalization through the operation of that elemental action of the molecules of fluids whereby constant pressure per unit of area can be maintained upon the walls of a container while the volume of the container is being varied; said method consisting in applying the pressure of a fluid, in chambers of variable volume, having communication with an external source of fluid pressure of suitable value, to balance the torque of a rotating element and to keep said torque constant during variations of angular velocity of the rotating element.

5. Means for preserving approximately constant torque between two members which oscillate with respect to each other, comprising: a chamber of variable capacity; a fluid restrained by the walls of said chamber; and means for maintaining said fluid at approximately constant pressure in said chamber; substantially as described.

6. Means for permitting variations of angular velocity of a rotating element while maintaining constant its active or reactive torque; comprising: a source of constant but adjustable fluid pressure; a chambered structure having one or more chambers of variable volume in communication with said source of constant fluid pressure; opposing walls of said chambers movable in relation to each other and adapted to transmit force, to balance the turning moment of said rotating element; and fluid contained in said chambers, adapted to flow in and out of the chambers while under constant pressure from said source.

7. In combination with a first rotative element having an appreciable moment of inertia, and a second element free to turn through an angular displacement in relation to said first element; torque transmitting means comprising a source of controlled fluid pressure and a structure having chambers with movable walls and variable volumetric capacity, in communication with said source of controlled fluid pressure.

8. In combination with a rotative element having an effective moment of inertia, means for equalizing the flow of energy in such manner that the rotative element can deliver a uniform output of energy while receiving a non-uniform input, and can deliver a non-uniform output while receiving a uniform input; said means comprising: a source of constant but adjustable fluid pressure; a chambered structure having one or more chambers of variable volume in communication with said source of constant fluid pressure; opposing walls of said chambers movable in relation to each other and adapted to transmit force to balance the average torque of the rotative element; and fluid in said chambers adapted to flow in and out of the chambers while under constant pressure from said source.

9. Torque equalizing means comprising a source of fluid supply; a driver element; a driven element; a flywheel secured to one of said elements; a chambered structure interacting with the driver and the driven elements; coacting movable walls in the chambered structure; and means for supplying fluid from the source of fluid supply to maintain practically constant pressure in the chambers of the chambered structure.

10. Torque equalizing means comprising a driver element and a driven element, one rotating at constant speed and the other rotating at pulsating speed; a flywheel carried by the pulsating-speed element; a chambered structure interacting with the driver and the driven elements; and fluid under controlled pressure in the chambered structure acting as a medium of transfer of torque from the driver element to the driven element.

11. Torque equalizing means comprising a driver element operating at constant speed; a driven element operating at pulsating speed; a flywheel carried by the driven element; a chambered structure interacting with the driver and driven elements; coacting walls in the chambered structure; and means for supplying fluid at constant pressure in the chambers of the chambered structure.

12. A torque equalizer comprising a driving shaft; a driven shaft; a flywheel on the driven shaft in conjunction with a structure having chambers to receive fluid; means for supplying fluid at constant pressure in the chambers of said structure and acting on movable walls therein, to cause the flywheel to accelerate when the load is less than its constant torque transmitted and permitting it to retard when the load is greater than the constant torque transmitted.

13. Torque equalizing means comprising a source of liquid under head; a constant speed driver element; a pulsating driven element; a chambered structure having two pairs of vanes oscillative relative to a common axis and coacting with the inner walls of the chambered structure, one pair of vanes moving at constant speed, and the other pair moving at variable speed; and liquid under head from said source of supply and applying constant fluid pressure within said chambered structure.

14. In an equipment of the class described, the combination of a driver element; a driven element; a chambered structure in operative relation to said driver and driven elements; a stand-pipe with an enlarged upper portion containing liquid and adjustable to different heights to vary the head of the liquid; and means of communication between the stand-pipe and the chambers of the chambered structure whereby the pressure of the liquid in said stand-pipe is transmitted to said chambers.

15. In an equipment of the class described, the combination of a closed tank adapted to contain liquid under compressed air; means for introducing compressed air into the tank above the liquid contained therein; a motor; a driven machine; a chambered structure having chambers with relatively movable opposing walls adapted to transmit driving force to the driven machine through the substance of a liquid contained in said chambers; and means of communication between said chambers and said closed tank whereby the liquid can flow in and out of the chambers while under approximately constant pressure from said compressed air.

16. In an equipment of the class described, the combination of a closed tank adapted to contain liquid under compressed air; means for introducing compressed air into the tank above the liquid contained therein; a motor and a driven machine; a chambered structure in operative relation to the tank, the motor and the driven machine; coacting walls in the chambers of said chambered structure; and means for supplying liquid from said tank at constant pressure on said coacting walls.

17. In a system for torque control, the combination of a container containing fluid at a predetermined pressure of sufficient value; a chambered structure having vanes; a driving shaft and a driven shaft in operative relation to said chambered structure; ducts in one of said shafts affording communication between said container and the chambers of said chambered structure; fluid in said ducts and said chambers partaking of the pressure transmitted from said container; ports terminating said ducts, in the chambered structure, in such operative relation with said vanes that said ports will be closed by one set of vanes when the vanes approach their limit of movement in one direction, thus shutting off communication between said chambers and said container; and openings to atmosphere through the walls of said chambered structure adapted to be closed by the passage of the other set of vanes, to form an air cushion, when the vanes approach their limit of movement in the opposite direction.

18. Electrically controlled torque-equalizing means comprising: a driving element, a driven element, a chambered structure having chambers of variable volume coacting with said driving and driven elements; a pressure tank containing fluid under pressure; fluid-conducting means affording communication between the pressure tank and the chambered structure; a source of fluid supply at suitable pressure greater than the pressure in the pressure tank; a three-way valve in communication with the pressure tank, the source of fluid supply and a discharge outlet to atmosphere; electro-magnets mechanically connected to operate the three-way valve; automatic means for closing said valve after each operation; an electrical limit-switch in operative relation with the chambered structure; magnet coils suitable to energize the electro-magnets; and a source of electromotive force electrically connected with the magnet coils through the limit-switch; all coacting in such manner that when the limit-switch is open, the valve is in its normal closed position and the pressure in the tank and chambers of the chambered structure remains approximately constant; when the limit-switch makes contact in one direction, corresponding with minimum volume of the chambers, the valve is turned to admit additional fluid into the tank to increase the fluid pressure in the tank and in the chambers of the chambered structure; and when the limit-switch makes contact in the opposite direction, corresponding with maximum volume of chambers, the valve is turned to discharge fluid from the tank to atmosphere thus reducing the pressure in the tank and in the chambers of the chambered structure.

It witness whereof I have signed my name to this specification at Minneapolis, Minnesota, this 19th day of December, 1925.

ALEXANDER DAWES DU BOIS.